United States Patent Office 3,437,676
Patented Apr. 8, 1969

3,437,676
CARBONYLATION OF OLEFINICALLY
UNSATURATED COMPOUNDS
Nikolaus von Kutepow, Karlsruhe, and Knut Bittler and
Dieter Neubauer, Ludwigshafen (Rhine), Germany, assignors to Badische Anilin- & Soda-Fabrik Aktiengesellschaft, Ludwigshafen (Rhine), Germany
No Drawing. Filed Aug. 7, 1964, Ser. No. 388,266
Claims priority, application Germany, Aug. 9, 1963,
B 73,054
Int. Cl. C07c 67/00
U.S. Cl. 260—468                                6 Claims

ABSTRACT OF THE DISCLOSURE

A carbonylation process in which an olefinically unsaturated compound is reacted with carbon monoxide and water to produce a carboxylic acid or with carbon monoxide and an alcohol or a phenol to produce a carboxylic acid ester, these reactions being carried out under the influence of a complex palladium salt as a catalyst in an amount of 0.01 to 1% by weight with reference to the olefinically unsaturated compound. For example, the catalyst may be bistriphenylphosphine palladium dichloride.

---

This invention relates to a new process for the carbonylation of olefinically unsaturated compounds to obtain carboxylic acids or carboxylic esters.

It is known that carboxylic acids or carboxylic esters can be obtained by reaction of olefines, carbon monoxide and water or alcohols at elevated temperature and under superatmospheric pressure. The catalysts used are in general salts of metals of Group VIII of the Periodic System which are capable of forming carbonyls. It is also possible to start from the metals themselves or from the metal carbonyls. The reaction is carried out in the presence of free or combined halogen as an activator.

According to another prior art method, carboxylic esters are obtained from the same initial materials in the presence of a catalyst consisting of an alcohol-soluble tin or germanium salt and an alcohol-soluble salt of a precious metal of Group VII of the Periodic System. This method is carried out at temperatures of 50° to 320° C. and under pressures of from 100 to 3000 atmospheres.

It is an object of this invention to provide a process by which olefinically unsaturated compounds may be carbonylated using a catalyst which has not hitherto been used for this purpose. It is another object of this invention to provide a process by which olefinically unsaturated compounds can be carbonylated under milder conditions than hitherto. A further object of this invention is to provide a process by which olefinically polyunsaturated compounds can be selectively carbonylated. Yet a further object of this invention is to provide a process which is applicable to the carbonylation of olefinic unsaturates obtained by diene addition, e.g., vinylcyclohexene-(3). Other objects of the invention will be apparent from the following description.

In accordance with this invention it has now been found that the said objects are achieved and olefinically unsaturated compounds are carbonylated with the formation of carboxylic acids and carboxylic esters, by reaction of olefinically unsaturated compounds with carbon monoxide and with water, alcohols or phenols in the presence of catalysts having the formula $L_mPdX_n$ in which L denotes an organic phosphine or phosphite, ammonia or an amine, a nitrile or an unsaturated hydrocarbon, X denotes an acid equivalent, $m$ denotes an integer from 1 to 4 inclusive and $n$ denotes 1 or 2, the sum of $m+n$ being an integer of from 2 to 6 inclusive.

The process according to this invention is carried out under much milder conditions than prior art carbonylation reactions. This is of particular advantage when it is desired to carbonylate olefinically polyunsaturated materials. Such compounds tend to undergo undesirable isomerization reactions under the relatively drastic conditions of the prior art carbonylation methods. These reactions lead, for example in the case of cyclododecatriene-(1,5,9) to loss of the twelve-member ring structure. By the new process, one, two or three carboxylic ester groups may be introduced into cyclododecatriene without changing the twelve-member ring structure.

Owing to the low reaction temperature, the conversion reaction in which carbon dioxide and hydrogen are formed from carbon monoxide and water, is suppressed. Owing to the decreased incidence of hydrogen, undesirable simple hydrogenation of the olefinically unsaturated initial materials is suppressed to a greater extent than in the prior art methods.

It is remarkable that in many cases no palladium metal is formed from the palladium compound during the reaction. It appears that in these cases the ligands L in the catalyst prevent reduction, because non-complex palladium salts are rapidly reduced to palladium metal under otherwise the same conditions. As compared with the above-mentioned catalysts consisting of tin or germanium salts and precious metal salts, the catalysts according to this invention have greater activity so that still lower temperatures are possible under otherwise the same conditions.

It is surprising that the catalysts having the composition $L_mPdX_n$ should yield carboxylic esters under the conditions of the process. From U.S. Patent No. 3,040,090 it is known that palladous acetylacetonate under comparable conditions produces carbonyl compounds and not carboxylic acids or carboxylic esters. Palladous acetylacetone has a certain similarity to the catalysts of the process according to this invention insofar as both catalysts are complex compounds in which salt and coordinative bonds are present side by side.

The initial materials for the process according to this invention are compounds having one or more olefinic double bonds. They may be hydrocarbons or may bear substituents which are inert under the reaction conditions, i.e. which do not interfere with the reaction at the olefinic double bond. Examples of such substituents are: carboxylic groups, carboxylic ester groups having two to five carbon atoms, carbonamide groups having one to seven carbon atoms, nitrilo groups, halogen atoms and ether bridges. It is also possible to react olefinically unsaturated compounds containing hydroxyl groups, e.g., allyl alcohol, the reaction product obtained then being the ester of the unsaturated alcohol in question with the carboxylic acid formed therefrom. When working in the presence of a saturated alcohol, such as methanol, it is mainly the methyl ester of the carbonylation product of the olefinically unsaturated hydroxyl compound which is obtained. The free acid is obtained in the presence of water. The following are specific examples of olefinically unsaturated compounds: ethylene, propene, butene-(2), hexene-(3), dodecene-(1), 2-ethylhexene-(1), propenylbenzene, cyclohexene, cyclooctene, cyclododecene, butadiene-(1,3), isoprene, piperylene, cyclooctadiene-(1,5), octatriene-(2,4,6), methylheptatriene, cyclododecatriene-(1,5,9), ethyl acrylate, acrylonitrile, acrylamide, N,N-dimethylmethacrylamide, allyl alcohol, vinyl chloride, allyl chloride, oleic acid, ricinoleic acid, undecylenic acid, methyl allyl ether, cyclohexadiene, acrolein, diethyl 1,2,5,6-tetrahydrophthalate, phenyldecatriene, vinyl acetate, vinyl cyclohexane, 2-ethinylpropene-(1), cycloheptatriene, styrene and isobutylene.

The preferred olefinically unsaturated initial materials are hydrocarbons with from two to twenty carbon atoms and up to four olefinic double bonds. They may have one acetylenic bond in conjugation with an olefinic linkage and may also contain an aromatic structure. They may bear as substituents one or two chlorine atoms, carboxylic groups, carboalkoxy groups having two to five carbon atoms, or alkoxy groups having one to four carbon atoms.

Pure carbon monoxide may be used. It is however also possible to react a commercial gas which contains inert components, such as saturated hydrocarbons or nitrogen. The amount of carbon monoxide, with reference to the olefinically unsaturated initial material, may vary within wide limits. Generally at least one mole of carbon monoxide is used for each double bond in the initial material. It is advantageous to use from 10 to 25 moles. The optimum ratio of carbon monoxide to olefinically unsaturated initial material also depends on the olefinically unsaturated initial material itself. When reacting ethylene or substituted ethylenes it has proved to be an advantage to use 35 to 95 mole percent, particularly 45 to 85 mole percent, with reference to the sum of ethylene and carbon monoxide or carbon monoxide and a corresponding amount of ethylene.

When the reaction is carried out in the presence of water, carboxylic acids are obtained, and when in the presence of alcohols or phenols, carboxylic esters are obtained. If a mixture of water and alcohol or phenol be used, a mixture of carboxylic acid and carboxylic ester is obtained provided sufficient amounts of alcohol or phenol are present. Since the tendency to the formation of carboxylic acids is very strong, water should be substantially excluded if a high yield of esters is desired. A water content of only 10% by weight in the alcohol markedly decreases the yield of ester.

The alcohols may belong to the aliphatic, cycloaliphatic or araliphatic series. They may, like the phenols, have hydrocarbon structure or bear substituents which are inert under the reaction conditions. These substituents may be the same as specified above in connection with the olefinically unsaturated initial materials. The reaction proceeds best with monohydric alcohols. If polyhydric alcohols or phenols are reacted, the production of monoesterified or polyesterified products may be favored by appropriate choice of the relative proportions.

Examples of suitable alcohols and phenols are: methanol, ethanol propanol, stearyl alcohol, isobutyl alcohol, tertiary-butyl alcohol, benzyl alcohol, $\beta$-phenylethyl alcohol, cyclohexanol, cyclooctanol, methyl glycol, epsilon-chloro-capryl alcohol, epsilon-hydroxycaproic acid, ethylene glycol, hexanediol-(1,6), butanetriol-(1,2,4), allyl alcohol, phenol, o-cresol, $\alpha$-naphthol and hydroquinone. Preferred alcohols are alkanols, alkanediols, cycloalkanols and arylalkanols, having up to 20 carbon atoms and which may contain 1 or 2 carboxylic groups, carboxylic ester groups with 2 to 6 carbon atoms, alkoxy groups with 1 to 4 carbon atoms, or halogen atoms.

Water, alcohol or phenol is advantageously used in a minimum amount of 1 equivalent for each olefinic double bond. In the interest of high yields it is expedient to use from 2 to 10 equivalents.

The catalysts for the new process are complex palladium salts in which the palladium is generally divalent. Salt bonds and coordinative bonds are therefore present side-by-side. The following are examples of suitable catalysts: bis-triphenylphosphine palladium dichloride, bis-tri-o-tolylphosphine palladium acetate, bis-tributylphosphine palladium nitrate, triphenylphosphinepiperidine palladium dichloride, triphenylphosphineallyl palladium monochloride, bis-piperidine palladium dichloride, bis-benzonitrile palladium dichloride, bis-triphenylphosphine palladium sulfate, diammino palladium dichloride, bis-trimethylamine palladium dichloride, cyclododecatriene-(1,5,9) palladium dichloride, bis-acrylonitrile palladium dichloride, benzylaminetriphenylphosphine palladium dichloride and pyridinetriphenylphosphine palladium dichloride, bis-triphenylphosphine palladium dibromide, bis-triphenylphosphine palladium diiodide, triphenylphosphinepyridine palladium dichloride, bis-triphenylphosphite palladium dichloride, bis-tri-o-tolylphosphite palladium dichloride, bis-triethylphosphite palladium dichloride, triphenylphosphine ammino palladium dichloride, bispiperazino palladium dichloride, tetra-n-butylamino palladium dichloride, bis-n-butylamino palladium dichloride, tetrakis-piperidine palladium dichloride, tetra-piperidine palladium dichloride and tris-triphenylphosphine palladium nitrate. Compounds such as allyl palladium monochloride, triphenylphosphine palladium dichloride and ethylene palladium dichloride, which may possibly be in the dimeric form are also suitable as catalysts.

The best results are achieved with those palladium catalysts which contain two coordinatively bound ligands L combined with the palladium atom or which have a bifunctional ligand L, on each palladium atom. Among the acid radicals X, the halide radicals and particularly the chloride radical, are preferred. In the preferred catalysts, the ligand L is an unsaturated hydrocarbon having two to twenty carbon atoms and one to four double bonds; an amine having up to 20 carbon atoms and one or two nitrogen atoms and which has saturated hydrocarbon structure apart from the nitrogen atoms or bears an aromatic radical, such as benzylamine, or has quasi-aromatic character, such as pyridine; a triarylphosphine or a triarylphosphite having eighteen to twenty-four carbon atoms; a trialkylphosphine or a trialkylphosphite having three to eighteen carbon atoms, a nitrile having two to ten carbon atoms and, apart from the nitrile groups, having aliphatic and/or aromatic hydrocarbon structure.

The production of the catalysts is known. Some of them, such as bis-triphenylphosphine palladium chloride, may be prepared by the action of the ligand molecule on the non-complex palladium salt, if necessary by heating and in a solvent. Other catalysts, such as triphenylphosphine palladium dichloride, are formed by reaction of a complex palladium salt containing two ligands per palladium atom with a non-complex palladium salt. If potential ligands are allowed to act on such compounds, the said complexes containing two ligands per palladium atom are again obtained. In this way it is possible to prepare compounds having different ligands in the molecule. Furthermore, catalysts for the process according to this invention may be prepared by the action of acids on palladium(0) compounds having four ligands, such as tetrakistriphenylphosphine palladium(0). Complex palladium-II compounds having two ligands may be isolated from the reaction mixtures.

The catalysts need to be used only in small amounts. In general 0.001 to 1% by weight, with reference to the olefinically unsaturated initial compound, is sufficient. Larger amounts of catalyst may be used but without any particular advantage attending such use. The palladium complex compound need not be used as such but may be produced in the reaction mixture. For example it is possible to use without previous isolation the reaction products of triphenylphosphine and palladium chloride or of hydrogen chloride on tetrakistriphenylphosphine palladium(0).

The reaction may be carried out in the presence or absence of an organic or inorganic acid. Examples of suitable acids are sulfuric acid, phosphoric acid, boric acid and also acetic acid, propionic acid and other carboxylic acids. The use of halogen hydracids, particularly of hydrogen chloride, is especially advantageous, because lower temperatures may then be used at a given catalyst concentration or lower catalyst concentrations at a given temperature. Moreover, halogen hydracids have a beneficial effect on the reusability of the catalyst solutions obtained in the working up. The acids are generally used in amounts of up to 10% by weight with reference to the whole of the initial materials. They may be used in alcoholic or aqueous solution, but optionally also in pure form.

The process according to this invention is advantageously carried out at a temperature of from 20° to 250° C. Within this temperature range, the temperatures used for the production of carboxylic acids are in general somewhat higher than those required when preparing esters of the same carboxylic acids. A preferred temperature range for the production of carboxylic esters is from 30° to 100° C., and for the production of carboxylic acids from 70° to 170° C.

In the reaction of olefinically polyunsaturated compounds it is often possible to introduce one or more carboxylic ester groups into the molecule by choice of appropriate temperatures. For example cyclododecatriene-(1,5,9) gives exclusively cyclododecadiene-(5,9)-carboxylic acid-(1)-ester when using 0.5% by weight, based on the olefin, of bis-triphenylphosphine palladium dichloride as catalyst in the presence of hydrogen chloride at 30° to 50° C. At 50° to 70° C. under otherwise the same conditions, cyclododecene-(9)-dicarboxylic acid-(1,5)-diester is also formed. Above 70° C. mixtures are formed which contain considerable amounts of cyclododecane tricarboxylic acid-(1,5,9)-triester. Of course, the reaction temperature is not the only variable which determines what products will be formed from olefinically polyunsaturated compounds. There are catalysts, such as bis-benzonitrile palladium dichloride, which even under more vigorous conditions, for example at 80° C. and 700 atmospheres, give practically exclusively cyclododecadiene-(5,9)-monocarboxylic acid-(1)-ester. The above-mentioned acids also influence the course of the reaction of olefinically polyunsaturated compounds. Thus cyclododecadiene-(5,9)-carboxylic acid-(1)-ester is preferentially obtained in the absence of acid from cyclododecatriene-(1,5,9) at 80° C. and 300 atmospheres carbon monoxide pressure in the presence of 0.5% by weight of bis-triphenylphosphine palladium dichloride. If olefinically polyunsaturated compounds are to be reacted, it is recommendable to ascertain by orienting preliminary experiments at what temperature and with which catalyst the desired results are best achieved.

The process according to the invention may be carried out at atmospheric pressure. In the interests of a higher rate of reaction however, it is advantageous to use superatmospheric pressure. In general, pressures of from 25 to 1000, preferably 75 to 1000, atmospheres are used. Higher pressures are also possible but not recommended because they do not produce any better results.

It is possible to employ solvents or diluents which are inert under the conditions of the process. Examples of such solvents are aliphatic and aromatic hydrocarbons and also halohydrocarbons. Individual examples are pentane, cyclohexane, gasoline fractions, benzene, toluene, methylene chloride and p-dichlorobenzene. The products of the process and the initial alcohols are also well suited to serve as solvents or diluents.

The process according to the invention may be carried out batchwise or continuously. In the former case, the alcohol which contains the catalyst, and the olefinically unsaturated compound may for example be placed with or without solvent or diluent in an autoclave having mixing means. Part of the carbon monoxide is forced into the autoclave and the mixture is heated to the reaction temperature. Further carbon monoxide is then forced in until the desired pressure has been reached. This pressure is then maintained by further supply of carbon monoxide at the rate at which it is being used up. Gaseous initial materials, such as ethylene and propylene, may be supplied to the reactor at the same time as the carbon monoxide. The reaction mixture is as a rule worked up by distillation. When the reaction according to this invention is carried out continuously, the trickling method may be used, but it is preferable to use the pool method. In the pool method, the liquid reactants with the suspended or dissolved catalyst and the carbon monoxide are supplied to the lower end of a reaction tower and the reaction product is withdrawn at the upper end. Countercurrent operation is also possible, the gas being introduced at the bottom and the liquid reactants at the top. In the trickling method, the mixture of liquid initial materials is passed downward over a supported catalyst. The liquid reactants and the carbon monoxide are passed cocurrent or countercurrent over the supported catalyst. In both the trickling and pool methods, it is recommended that an excess of carbon monoxide be used and that unreacted gas and other unreacted initial materials be recycled.

The invention is further illustrated by the following examples in which parts are parts by weight.

EXAMPLE 1

95 parts of methanol, 0.8 part of tetrakis-triphenylphosphine palladium(0) and 3 parts of 5 N aqueous hydrochloric acid are charged under nitrogen into a corrosion-resistant steel autoclave which has been swept out with nitrogen. The autoclave is closed and liquid propylene is pumped in until the pressure is 12 atmospheres gauge. Then 200 atmospheres gauge of carbon monoxide is forced in cold and the autoclave set in rotation and heated to 90° C. After this temperature has been reached, further carbon monoxide is forced in until the pressure is 700 atmospheres and this pressure is maintained by forcing in further carbon monoxide until no more carbon monoxide is absorbed. A total of 1240 atmospheres gauge of carbon monoxide is absorbed during the course of about ten hours. 293 parts of crude product is obtained. This is washed with an equal volume of a saturated aqueous calcium chloride solution to remove methanol, and the ester thus separated. The ester layer is dried with calcium chloride, filtered and distilled at first at atmospheric pressure and later under subatmospheric pressure. The fractions at 85° to 102° C. at 760 mm. Hg and at 50° to 110° C. at 22 mm. Hg are combined. In this way 230 parts of $C_4$-carboxylic acid ester having an acid number of 21 (mainly caused by butyric acid formed in small amounts) is obtained. The combined fractions are investigated by gas chromatography. In addition to 7 parts of butyric acid, 140 parts of methyl isobutyrate and 82 parts of methyl n-butyrate have been formed. The components may be separated by careful rectification. The total yield of ester, with reference to reacted propylene, is practically quantitative and with reference to methanol is 79.5%.

EXAMPLE 2

95 parts of ethanol, 0.8 part of tetrakis-triphenylphosphine palladium(0) and 3 parts of 5 N aqueous hydrochloric acid are reacted with propylene and carbon monoxide as described in Example 1. A total of 620 atmospheres of carbon monoxide is absorbed over a period of six hours and 236 parts of crude product is obtained from which 192 parts of distillate is recovered as in Example 1. This consists of 125 parts of ethyl isobutyrate and 59 parts of ethyl n-butyrate, together with 8.3 parts of $C_3$-acids. The yield of esters, with reference to ethanol, is 84% and with reference to olefin reacted is almost quantitative.

EXAMPLE 3

96 parts of propanol, 0.8 part of tetrakis-triphenylphosphine palladium (0) and 3 parts of 5 N aqueous hydrochloric acid are reacted with propylene and carbon monoxide at 60° C. and 700 atmospheres gauge as in Example 1. Absorption of carbon monoxide over a period of six hours is 540 atmospheres. The crude product amounts to 188 parts and gives two fractions having boiling points of 75° to 145° C. at 760 mm. Hg and 48° to 143° C. at 19 mm. Hg. These fractions are combined; the mixture amounts to 157 parts and has an acid number of 18.1. According to gas chromatographic investigation, it consists of about 101 parts of propyl isobutyrate and about 52 parts of propyl butyrate. The yield is 75% with reference to propanol and almost quantitative with reference to propylene reacted.

EXAMPLE 4

95 parts of ethanol, 0.8 part of bis-triphenylphosphine palladium dichloride and 3 parts of 5 N aqueous hydrochloric acid are reacted in an autoclave with propylene and carbon monoxide at 70° C. and 700 atmospheres gauge as in Example 1. 620 atmospheres of carbon monoxide is absorbed over a period of four hours. The product (222 parts) consists of 111 parts of ethyl isobutyrate and 47 parts of ethyl n-butyrate, equivalent to a yield of 70% with reference to ethanol. The yield is almost quantitative with reference to propylene reacted.

EXAMPLE 5

95 parts of ethanol, 0.8 part of bis-triphenylphosphine palladium dichloride and 2.7 parts of 5 N aqueous hydrochloric acid are allowed to react with propylene and carbon monoxide at 60° C. and 700 atmospheres gauge as described in Example 1. The absorption of carbon monoxide over a period of ten hours is 870 atmospheres. 221 parts of crude product is obtained. The catalyst crystallizes out unchanged from the product and may be used again. From the liquid portion of the crude product, a distillate is obtained consisting of 109 parts of ethyl isobutyrate and 58 parts of ethyl n-butyrate. The yield is equivalent to 73% with reference to ethanol.

EXAMPLE 6

95 parts of ethanol, 1.6 parts of bis-triphenylphosphine palladium dichloride and 3 parts of aqueous 5 N hydrochloric acid are reacted as in Example 1 with propylene and carbon monoxide at 50° C. and 700 atmospheres gauge. 820 atmospheres of carbon monoxide is absorbed over a period of twenty hours and 236.5 parts of crude product is obtained. This gives 172 parts of distillate having an acid number of 25.1 and containing 106 parts of ethyl isobutyrate and 59 parts of ethyl n-butyrate. The yield is equivalent to 72.5 with reference to ethanol.

EXAMPLE 7

95 parts of ethanol, 0.2 part of palladium dichloride, 0.6 part of triphenylphosphine and 3 parts of 5 N aqueous hydrochloric acid are reacted with propylene and carbon monoxide at 60° C. as in Example 1. The total absorption of carbon monoxide over a period of eight hours is 620 atmospheres. The product weighs 219 parts and gives a distillate of 182.5 parts having an acid number of 28.3. This is composed of 126 parts of ethyl isobutyrate and 49 parts of ethyl n-butyrate. The yield with reference to the alcohol is 76.5%.

EXAMPLE 8

(Comparison experiment with palladium dichloride as catalyst)

95 parts of ethanol, 0.8 part of palladium dichloride and 3 parts of 5 N aqueous hydrochloric acid are reacted as in Example 1 with propylene and carbon monoxide. 150 atmospheres of carbon monoxide is absorbed over a period of six hours. The product weighs 99 parts and yields 31.5 parts of ester mixture consisting of 23 parts of ethyl isobutyl and 8 parts of ethyl n-butyrate. The yield is 13.2% with reference to ethanol. The palladium salt is reduced to palladium.

Experiments at 100° C., 90° C., and 60° C. also yield only very little reaction product or none at all.

EXAMPLE 9

95 parts of ethanol and 0.8 part of bis-triphenylphosphine palladium dichloride are allowed to react with propylene and carbon monoxide, without adding hydrochloric acid, at 70° C. and 700 atmospheres gauge under the conditions of Example 1. Carbon monoxide absorption is 660 atmospheres gauge. From 196 parts of crude product there is obtained 148.5 parts of distillate having a boiling range of 80° to 118° C., consisting of 45.5 parts of ethyl butyrate and 103 parts of ethyl isobutyrate. The yield is 62.5% with reference to ethanol.

EXAMPLE 10

95 parts of methanol, 140 parts of butene-(2), 0.8 part of bis-triphenylphosphine palladium dichloride and 3 parts of 5 N aqueous hydrochloric acid are reacted at 70° C. and a pressure of 700 atmospheres gauge. 180 atmospheres of carbon monoxide is absorbed. From 148 parts of product there is obtained 49 parts of methyl 2-methylbutyrate having a boiling point of 108° to 114° C.

*Analysis.*—Calculated: C, 62.1; H, 10.42. Found: C, 62.2; H, 10.6.

The yield, with reference to olefin reacted, is almost quantitative.

EXAMPLE 11

105 parts of cyclooctene, 87 parts of methanol containing hydrogen chloride (acid number 7.15) and 0.8 part of bis-triphenylphosphine palladium chloride are carbonylated at 70° C. under a pressure of 700 atmospheres gauge as in Example 1. 130 atmospheres of carbon monoxide is absorbed. The crude product, consisting of two layers, weighs 214 parts. To remove methanol it is washed with aqueous calcium chloride solution and dried with solid calcium chloride, 121 parts of crude ester being thus obtained which is distilled in a water jet pump vacuum. 80 parts of a fraction boiling at 110° to 116° C. at 20 mm. Hg is obtained consisting of cyclooctane carboxylic acid methyl ester (iodine number 0; refractive index $n_D^{15}$: 1.4664).

*Analysis.*—Calculated: C, 70.2; H, 11.9. Found: C, 70.7; H, 10.7.

Fractions obtained at the boiling points 97° to 107° C. at 20 mm. Hg (iodine number 23.3), 107° to 110° C. at 20 mm. Hg (iodine number 2.3) and 116° to 129° C. at 20 mm. Hg (iodine number 1.2) still contain some cyclooctene, as may be seen from their iodine numbers, but otherwise consist of the reaction product. These fractions weigh 3.5, 19.5 and 6 parts and after withdrawal of the cyclooctene contain a total of 28 parts of ester. The total amount of cyclooctane carboxylic acid ester is thus 108 parts, equivalent to a yield of 67.5% with reference to cyclooctene.

EXAMPLE 12

123 parts of cyclohexene, 87 parts of methanol containing hydrogen chloride (acid number 7.15) and 0.8 part of bis-triphenylphosphine palladium dichloride are carbonylated at 70° C. and a carbon monoxide pressure of 700 atmospheres gauge as in Example 1. 140 atmospheres of carbon monoxide is thus absorbed and a crude product of 205 parts is obtained which is processed as in Example 1. Unreacted cyclohexene distils over at 82° to 87° C. at 760 mm. Hg. The fraction which boils at 60° to 72° C. at 20 mm. Hg gives 9 parts of the methyl ester of cyclohexane carboxylic acid which still contains some cyclohexene, as evidenced by the iodine number of 5 (refractive index $n_D^{20}$: 1.4455). The yield with reference to reacted olefin is about 80%.

EXAMPLE 13

64 parts of methanol, 116 parts of allyl alcohol, 1 part of bis-triphenylphosphine palladium dichloride and 5 parts of half-concentrated aqueous hydrochloric acid are charged into an autoclave. The autoclave is rinsed with nitrogen, 100 atmospheres of carbon monoxide is forced in, the autoclave is heated to 100° C. and then carbon monoxide is forced in until the pressure is 300 atmospheres. The pressure and temperature are kept constant for eighteen hours. The autoclave is then cooled and decompressed. The lower aqueous layer is separated from the 238 parts of liquid reaction product and discarded. The organic phase is shaken up twice with calcium chloride solution, dried with solid calcium chloride and distilled at 15 mm. Hg. The distillate is united with the contents of the cooled trap, again washed with water, dried with calcium chloride and distilled at standard pressure over an effective column. 3.8 parts of first runnings (boiling range 70° to 105° C.), 89 parts of methyl vinylacetate having a boiling point of 105° to 110° C. and 14.3 parts of last runnings (boiling range 111° to 140° C.) are obtained. The methyl vinylacetate has obviously been formed by dehydration of gamma-hydroxy-butyric ester primarily formed.

The methyl vinylacetate gives the following analysis: Found: C, 60.2%; H, 8.3%; O, 31.2%; molecular wt., 99. Calculated: C, 60.0%; H, 8.0%; O, 32.0%; molecular wt., 100.

The last runnings contains, in addition to methyl vinylacetate, allyl vinylacetate and small amounts of free vinylacetic acid. 2.4 parts remains as distillation residue.

EXAMPLE 14

162 parts of cyclododecatriene-(1,5,9), consisting of 97% of trans,trans,cis isomer and 3% of all-trans isomer, 95 parts of ethanolic hydrochloric acid (acid number 168) and 1 part of triphenylphosphinepiperidine palladium dichloride are charged into a high-quality steel autoclave. The autoclave is rinsed with nitrogen, 200 atmospheres gauge of carbon monoxide is forced in and the whole heated to 50° C. As soon as this temperature has been reached, carbon monoxide is forced in until the pressure is 700 atmospheres gauge and this pressure and the said temperature are maintained for four hours. The autoclave is cooled to room temperature, decompressed and emptied. 299 parts of product is obtained which is washed twice with saturated calcium chloride solution and once with saturated sodium carbonate solution. It is then dried over solid calcium chloride. The calcium chloride is filtered off and the liquid phase is distilled over a column. 12.8 parts of first runnings is obtained which boils at 63° to 101° C. at 0.4 mm. Hg and which contains a little cyclododecadiene-(5,9)-monocarboxylic acid-(1)-ethyl ester and otherwise consists of unchanged cyclododecatriene-(1,5,9), 119.7 parts of cyclododecadiene-(5,9)-monocarboxylic acid-(1)-ethyl ester having a boiling point of 101° to 115° C. and 86.4 parts of cyclododecene-(9)-dicarboxylic acid-(1,5)-diethyl ester having a boiling point of 145° to 152° C. at 0.4 mm. Hg. 15 parts of a difficultly distillable residue remains in the still. The hitherto unknown cyclododecadiene-(1,5)-monocarboxylic acid-(9)-ethyl ester is characterized by the following data.

Analysis.—Calculated: C, 76.3; H, 10.16; O, 13.56. Found: C, 76.1; H, 10.1; O, 14.00. Iodine number: Calculated, 216. Found, 216. Saponification number: Calculated, 237.5. Found: 241, 254, 232. Refractive index: $n_D^{20}$: 1.4910.

Hydrogenation of cyclododecadiene-(1,5)-monocarboxylic acid-(9)-ethyl ester with Adams catalyst in glacial acetic acid, followed by saponification, gives a quantitative yield of cyclododecane carboxylic acid having a melting point of 97° to 99° C. A mixed melting point with authentic cyclododecane carboxylic acid gives no depression of the melting point. The hitherto unknown cyclododecene-(9)-dicarboxylic acid-(1,5)-diethyl ester has the following data.

Analysis.—Calculated: C, 69.7; H, 9.67; O, 20.62. Found: C, 69.8; H, 9.8; O, 20.3. Hydrogenation iodine number: Calculated: 82. Found: 80, 76, 82. Saponification number: Calculated: 361. Found: 358, 365. Molecular weight: Calculated: 310. Found: 276, 304 (ebullioscopically). 20 Refractive index: $n_D^{20}$: 1.4803.

EXAMPLES 15 TO 19

The procedure of Example 14 is followed, but under the conditions set out in the table below (column 1: acid number of the ethanol; 2: temperature in ° C.; 3: pressure in atmospheres gauge) and the results set out in the table are obtained (column 4: product obtained in parts; 5: parts of cyclododecatriene-(1,59) obtained by vacuum distillation; 6: parts of cyclododecadiene-(5,9)-monocarboxylic acid-(1)-ethyl ester obtained by vacuum distillation; 7: parts of cyclododecene-(9)-dicarboxylic acid-(1,5)-diethyl ester obtained by vacuum distillation; 8: parts of residue in the vacuum distillation).

TABLE

| Example | 1 | 2 | 3 | 4 | 5 | 6 | 7 | 8 |
|---|---|---|---|---|---|---|---|---|
| 15 | 93.1 | 30 | 300 | 263 | 128.2 | 8.3 | | 1 |
| 16 | 177 | 40 | 300 | 286 | 48.7 | 110.2 | 16.8 | 6 |
| 17 | 168 | 50 | 700 | 299 | 12.8 | 119.7 | 86.4 | 15 |
| 18 | 153 | 60 | 700 | 297 | 4.3 | 51.6 | 131 | 24.2 |
| 19 | 164 | 100 | 700 | 305 | 2 | 28.7 | 114.9 | 60.1 |

EXAMPLES 20 TO 25

The procedure of Example 14 is followed but 1 part of bis-triphenylphosphine palladium dichloride is used instead of triphenylphosphinepiperidine palladium dichloride. Under the conditions of columns 1 to 3, the results given in columns 4 to 8 of the following table are obtained, columns 1 to 8 in the table have the same meanings as in Examples 15 to 19.

TABLE

| Example | 1 | 2 | 3 | 4 | 5 | 6 | 7 | 8 |
|---|---|---|---|---|---|---|---|---|
| 20 | 166 | 40 | 300 | 272 | 130.6 | 25.5 | | 2 |
| 21 | 166 | 59 | 300 | 278 | 88.3 | 94.1 | 5.6 | 6.5 |
| 22 | 177 | 59–55 | 300 | 296 | 28.8 | 119.3 | 38.3 | 9 |
| 23 | 153 | 60 | 700 | 288 | 34.8 | 118.3 | 50.6 | 15.7 |
| 24 | 164 | 70 | 700 | 302 | 5.1 | 94 | 121 | 25 |
| 25 | 67.6 | 100 | 700 | 298.5 | 2.4 | 44 | 127 | 49 |

From a carbonylation of cyclododecatriene-(1,5,9) carried out at 80° C., there may be isolated, in addition to the said products, 14 parts of a liquid having a boiling point of 190° to 200° C. at 0.4 mm. Hg which, according to analysis and iodine number, is the triethyl ester of cyclododecane tricarboxylic acid.

Analysis.—Calculated: C, 65.6; H, 9.37. Found: C, 65.6; H, 9.6. Iodine number: Calculated: 0. Found: 6.7.

EXAMPLES 26 TO 30

The procedure of Example 14 is followed but 1 part of bis-benzonitrile palladium dichloride is used instead of triphenylphosphinepiperidine palladium dichlorde. The following table (in which the columns have the same meanings as in Examples 15 to 19) give the conditions used and the results obtained:

TABLE

| Example | 1 | 2 | 3 | 4 | 5 | 6 | 7 | 8 |
|---|---|---|---|---|---|---|---|---|
| 26 | 143.8 | 50 | 300 | 270 | 95.3 | 54.7 | | 4 |
| 27 | 133 | 60 | 700 | 266 | 95.7 | 62.6 | | 9.5 |
| 28 | 154 | 60 | 300 | 280 | 37.9 | 106.7 | 23.3 | 1.6 |
| 29 | 154 | 80 | 300 | 299 | 3.4 | 58.4 | 110.6 | 17.1 |
| 30 | 141 | 50 | 75 | 262 | 101.9 | 44.2 | | 3.9 |

EXAMPLES 31 TO 34

The procedure of Example 14 is followed but 1 part of bispiperidine palladium dichloride is used instead of piperidinetriphenylphosphine palladium dchlorde. The conditions used and the results obtained are given in the following table in which columns 1 to 8 have the same meanings as in the preceding examples.

TABLE

| Example | 1 | 2 | 3 | 4 | 5 | 6 | 7 | 8 |
|---|---|---|---|---|---|---|---|---|
| 31 | 166 | 40 | 300 | 274 | 68.5 | 56.2 | | 8.0 |
| 32 | 166 | 50 | 300 | 276 | 64.5 | 76.4 | | 11.0 |
| 33 | 159 | 60 | 300 | 280 | 48.0 | 95.6 | | 17.9 |
| 34 | 159 | 80 | 300 | 294 | 3.9 | 49.4 | 96.1 | 14.7 |

EXAMPLES 35 to 38

Beige colored allyltriphenylphosphine palladium monochloride (decomposition point 163° C. is prepared from 3.66 parts of allyl palladium monochloride by reaction with 5.2 parts of triphenylphosphine in 210 parts of benzene. By using this substance as catalyst and following the procedure of Example 14, the results obtained in the following table are obtained, the columns having the same meanings as in the preceding examples.

*Analysis.*—Calculated: C, 56.6%; H, 4.5%; Cl, 8.0%; P, 6.9%; Pd, 23.9%. Found: C, 57.1%; H, 4.7%; Cl, 8.1%; P, 5.7%; Pd, 23.7%.

TABLE

| Example | 1 | 2 | 3 | 4 | 5 | 6 | 7 | 8 |
|---------|-----|----|-----|-----|-------|-------|-------|------|
| 35      | 147 | 40 | 700 | 274 | 78.8  | 76.7  |       | 9.7  |
| 36      | 170 | 50 | 700 | 300 |       | 45.1  | 107.3 | 27.1 |
| 37      | 162 | 40 | 300 | 266 | 78.3  | 27.3  |       | 5.0  |
| 38      | 141 | 50 | 75  | 262 | 105.4 | 23.9  |       | 3.7  |

EXAMPLE 39

162 parts of cyclododecatriene-(1,5,9) is carbonylated in the presence of 95 parts of alcohol using 1 part of bis-triphenylphosphine palladium dichloride as catalyst at 80° C. at a carbon monoxide pressure of 300 atmospheres. 268 parts of product is obtained. This is distilled and in addition to 72 parts of cyclododecadiene-(5,9)-carboxylic acid-(1)-ethyl ester, there are obtained 105 parts of unreacted cyclododecatriene-(1,5,9), 75 parts of alcohol and 5.5 parts of residue. The conversion of cyclododecatriene-(1,5,9) is 35%, the yield of cyclododecadiene-(5,9)-carboxylic acid-(1)-ethyl ester, with reference to cyclododecatriene-(1,5,9) reacted, is 87%.

EXAMPLE 40

The procedure of Example 39 is followed but 88 parts of benzene is still used as the solvent. The product amounts to 352 parts. By distillation, 105 parts of unchanged cyclododecatriene-(1,5,9), 156 parts of a mixture consisting of benzene and alcohol, and 79.5 parts of cyclododecadiene-(5,9)-carboxylic acid-(1)-ethyl ester are obtained. The residue is 7 parts. Conversion of cyclododecatriene-(1,5,9) is 35.2% and the yield of cyclododecadiene-(5,9)-carboxylic acid-(1)-ethyl ester, with reference to reacted cyclododecatriene-(1,5,9) is 96%.

EXAMPLE 41

6 parts of finely ground dibenzonitrile palladium dichloride is suspended in 150 parts of cyclododecatriene-(1,5,9) and the suspension is stirred vigorously and nitrogen for one hour at room temperature and then for thirty minutes at 55° C. The cyclododecatriene-(1,5,9) palladium dichloride formed is suction filtered under nitrogen, washed with petroleum ether and dried in vacuo. 3.1 parts of cyclododecatriene-(1,5,9) palladium dichloride is obtained as a yellow brown substance having a decomposition point of 150° to 155° C.

*Analysis.*—Calculated: C, 42,3%; H, 5.3%; Cl, 20.9%; Pd, 31.4%. Found: C, 42.6%; H, 5.5%; Cl, 21.7%; Pd, 30.8%.

0.35 part of the complex is charged with 60 parts of cyclododecatriene-(1,5,9) and 40 parts of ethanolic hydrochloric acid (acid number 143) into an autoclave, 200 atmospheres of carbon monoxide is forced in, the whole heated to 60° C. and further carbon monoxide forced in until the pressure has risen to 700 atmospheres. The reaction period is four hours. The reaction product is processed as in Example 14. 11 parts of cyclododecadiene-(5,9)-monocarboxylic acid-(1)-ester is obtained in addition to 29 parts of unreacted cyclododecatriene-(1,5,9).

EXAMPLE 42

2.5 parts of bis-benzonitrile palladium dichloride, 95 parts of ethanol, 52.7 parts of benzene and 1 part of 5 N aqueous hydrochloric acid are added to an autoclave which has been flushed out with nitrogen. After the autoclave has been closed, 108 parts of butadiene-(1,3) is first forced in and then 200 atmospheres gauge of carbon monoxide. The temperature is brought to 70° C. and carbon monoxide is forced in until the pressure is 700 atmospheres gauge. A fall in pressure of 510 atmospheres gauge is observed over a period of eight hours. The product is 364 parts. It was washed twice with saturated calcium chloride solution and dried over solid calcium chloride. It is then distilled, 183 parts of trans-pentene-(2) carboxylic acid-(4)-ethyl ester is obtained which boils at 145° to 150° C. at 760 mm. Hg and has a refractive index $n_D^{20}$: 1.4228.

*Analysis.*—Calculated: C, 65.6%; H, 9.38%. Found: C, 66.1%; H, 9.5%. Iodine number: Calculated, 198.5. Found: 195, 197.3, 189.5.

The trans-double bond can be detected in the infrared spectrum. The yield, with reference to butadiene-(1,3), is 71.5%. In addition to the main fraction of trans-pentene-(2)-carboxylic acid-4-ethyl ester, there are obtained 54.5 parts of first runnings containing benzene, 22.5 parts of unidentified last runnings and 5 parts of residue.

EXAMPLE 43

120 parts of diethyl tetrahydrophthalate, 95 parts of ethanol containing hydrogen chloride (acid number 172) and 1 part of bis-triphenylphosphine palladium dichloride are charged under nitrogen into an autoclave of corrosion-resistant steel. The autoclave is closed and carbon monoxide is forced in until the pressure is 300 atmospheres. The autoclave is then set in rotation and heated to 90° C. When this temperature has been reached, the pressure is raised to 700 atmospheres by forcing in carbon monoxide and kept at this level by forcing in further amounts until it has remained constant for four hours. A total of 80 atmospheres of carbon monoxide is absorbed during a period of about three hours. 225 parts of a single phase product is obtained which is fractionally distilled. 42 parts of alcohol pass over at about 78° C. at standard pressure. Further fractionation is carried out in an oil pump vacuum. A fraction of 143 parts having a boiling point of 156° to 170° C. at 0.2 to 0.6 mm. Hg is obtained which consists of the triethyl ester of perhydrotrimellitic acid. The yield is 86%, with reference to diethyl tetrahydrophthalate and the refractive index is $n_D^{20}$: 1.4586.

EXAMPLE 44

120 parts of bicyclo-[2,2,1]-heptene-(4)-dicarboxylic acid-(1,2)-diethyl ester, 95 parts of ethanol containing hydrogen chloride (acid number 200) and 1 part of bis-triphenylphosphine palladium dichloride are reacted with carbon monoxide as described in Example 43. 50 atmospheres of carbon monoxide is absorbed. The crude product is 223 parts. This is fractionally distilled. 63 parts of alcohol are recovered. Further fractionation takes place in an oil pump vacuum. 4 parts of unchanged initial material and 82.5 parts of bicycloheptane-[2,2,1]-tricarboxylic acid triethyl ester-(1,2,4) are obtained. The yield is 52.5% with reference to bicyclo-[2,2,1]-heptene-(4)-dicarboxylic acid-(1,2)-diethyl ester. The refractive index is $n_D^{20}$: 1.4756.

EXAMPLE 45

100 parts of ethanolic hydrochloric acid having an acid number of 73 and 1 part of bis-triphenylphosphine palladium dichloride are charged into an autoclave of corrosion-resistant steel. The autoclave is closed and rinsed out with nitrogen; a 1:1 mixture of carbon monoxide and ethylene is then forced in until the pressure is 450 atmospheres. The autoclave is then set in rotation and heated to 60° C. When this temperature has been reached, carbon monoxide is again forced in until the pressure is 700 atmospheres. By forcing in fresh carbon monoxide and by heating, the pressure and temperature are kept at the said levels for ten hours. The autoclave is then cooled and decompressed. 170 parts of crude product is obtained from which 18.3 parts of solid is separated by filtration. The solid portion consists of a polyketone which is insoluble in all the usual solvents. The filtrate is washed with saturated calcium chloride solution and with saturated sodium carbonate solution, dried with solid calcium chloride and fractionated in a short column. 44.9 parts of ethyl propionate is obtained having a boiling point of 98° to 101° C.

EXAMPLES 46 TO 48

The procdeure of Example 45 is followed but under other reaction conditions, set out below. The results obtained are also given in the following table:

| Example | 46 | 47 | 48 |
|---|---|---|---|
| Acid number of the ethanolic hydrochloric acid | 70 | 73 | 126 |
| Temperature in ° C | 80 | 90 | 70 |
| Parts of product | 222 | 223 | 200 |
| Parts of polyketone | <0.8 | <0.6 | 0 |
| Parts of ethyl propionate | 166.7 | 130.9 | 152.3 |
| Parts of residue | 30.3 | 15.4 | 9.5 |

EXAMPLES 49 to 52

The procedure of Example 45 is followed using the following catalysts:

Example 49 bis-piperidine palladium dichloride
Example 50 piperidinetriphenylphosphine palladium dichloride
Example 51 allyltriphenylphosphine palladium chloride
Example 52 palladium tetrakis-triphenylphosphine.

The conditions and results are given in the following table:

| Example | 49 | 50 | 51 | 52 |
|---|---|---|---|---|
| Acid number of the ethanolic hydrochloride acid | 126 | 126 | 126 | 123 |
| Temperature in ° C | 90 | 90 | 90 | 90 |
| Parts of product | 266 | 249 | 237 | 188 |
| Parts of polyketone | | | | |
| Parts of ethyl propionate | 164.5 | 150.4 | 153.1 | 136.8 |
| Parts of residue | 32.8 | 25.8 | 21.6 | 51.5 |

EXAMPLES 53 TO 54

The procedure of Example 45 is followed using 0.1 part of bis-triphenylphosphine palladium dichloride in Example 53 and bis-benzonitrile palladium dichloride in Example 54 as the catalyst. The following results are obtained:

| Example | 53 | 54 |
|---|---|---|
| Acid number of ethanolic hydrochloric acid | 92 | 92 |
| Temperature in ° C | 110 | 110 |
| Parts of product | 209 | 173 |
| Parts of polyketone | | |
| Parts of ethyl propionate | 149.0 | 110.1 |
| Parts of residue | 9.8 | 6.1 |

EXAMPLE 55

148 parts of isobutanol, 1 part of bis-triphenylphosphine palladium dichloride and 5 parts of 5 N aqueous hydrochloric acid are charged under nitrogen into an autoclave of corrosion-resistant steel which has been flushed out with nitrogen. The autoclave is closed and a 50:50 mixture of ethylene and carbon monoxide is forced in until the pressure is 450 atmospheres. The autoclave is then set in rotation and heated to 100° C. When this temperature has been reached, the pressure is raised to 700 atmospheres by forcing in more of the ethylene-carbon monoxide mixture. This pressure is maintained until the end of the reaction by continuously forcing in fresh gas mixture. A total of 450 atmospheres gauge of the 50:50 ethylene-carbon monoxide mixture is absorbed over a period of about ten hours. 276 parts of crude product is obtained which is filtered, washed twice with 250 parts of water to remove excess isobutanol and then distilled over a column. A first runnings of 4 parts is obtained and, then at 136° to 138° C., 183 parts of isobutyl propionate (saponification number 425; calculated 431). 21 parts of keto compounds of higher boiling point follow as last runnings.

EXAMPLES 56 TO 60

95 parts of ethanol and 3 parts of 5 N aqueous hydrochloric acid are reacted as in Example 55 with a 1:1 mixture of ethylene and carbon monoxide until no further decrease in pressure occurs. This usually takes ten to twenty hours. The catalysts used are:

Example 56 tetrakis-triphenylphosphine palladium
Example 57 bis-triphenylphosphine palladium dichloride
Example 58 triphenylphosphinepiperidine palladium dichoride
Example 59 triphenylphosphinepiperidine palladium dichloride
Example 60 triphenylphosphine palladium dichloride.

Conditions and results are as follows:

| Example | 56 | 57 | 58 | 59 | 60 |
|---|---|---|---|---|---|
| Parts of catalyst | 0.8 | 1.0 | 1.0 | 1.0 | 1.0 |
| Temperature in ° C | 90 | 80 | 100 | 60 | 60 |
| Total absorption of gas in atmospheres | 500 | 530 | 530 | 680 | 730 |
| Parts of product | 235 | 226 | 231 | 229 | 193 |
| Parts of solid polyketone | Traces | 2.4 | 0.9 | 13.7 | ca. 5 |
| Parts of ethyl propionate | 149 | 145 | 160 | 137 | 128 |
| Parts of higher boiling byproducts | 62 | 52 | 49 | 45 | 42 |

EXAMPLE 61

An autoclave of corrosion-resistant steel is charged with about 100 parts of vinyl chloride, 80 parts of ethanolic hydrochloric acid (acid number 50), 1 part of bis-triphenylphosphine palladium dichloride and 1 part of tertiary-butylpyrocatechol as polymerization inhibitor. Carbon monoxide is forced in up to a pressure of 300 atmospheres and the autoclave is set in rotation and heated to 90° C. Carbon monoxide is forced in up to 700 atmospheres and the said pressure and temperature are maintained for four hours. The total absorption of carbon monoxide is 140 atmospheres. The autoclave is cooled and decompressed and a crude product of 247 parts is obtained which is washed with calcium chloride solution and sodium carbonate solution and then dried over calcium chloride. The product is distilled over a short column and 58 parts of first runnings, mainly consisting of ethanol, and 80.4 parts of ethyl α-chloropropionate having a boiling point of 140° to 144° C. are obtained. Upon further distillation, an intermediate runnings of about 2 parts is obtained followed by a substance boiling at 163° C. which according to its infrared absorption spectrum is ethyl β-chloropropionate.

EXAMPLE 62

80 parts of 6% by weight aqueous hydrochloric acid, 200 parts of propylene and 1 part of bis-triphenylphosphine palladium dichloride are charged under nitrogen into an autoclave of corrosion-resistant steel which has been rinsed with nitrogen. The autoclave is closed and carbon monoxide is forced in up to a pressure of 300 atmospheres. The autoclave is then set in rotation and heated to 120° C. When this temperature has been reached, the pressure is increased to 700 atmospheres by forcing in carbon monoxide and kept at this level for five hours by forcing in carbon monoxide continuously, until the pressure remains constant for two hours. 370 atmospheres of carbon monoxide are thus absorbed over a period of five hours. The product is extracted with 175 parts of ether. After the ether has been removed, the product is fractionated over a column. The butyric acid fraction passes over at 154° to 155° C.; refractive index $n_D^{20} = 1.3960$.

EXAMPLE 63

110 parts of 18% by weight hydrochloric acid and 0.8 part of bis-triphenylphosphine palladium dichloride are placed in an autoclave which is then rinsed out with nitrogen. About 300 parts of butadiene and carbon monoxide are forced in up to a pressure of 300 atmospheres. The autoclave is heated to 120° C. and then carbon monoxide is forced in up to a pressure of 700 atmospheres. A temporary rise in temperature to 140° C. is observed. Four hours later the autoclave is cooled and decompressed. With a total gas absorption of 1070 atmospheres, 570 parts of product is obtained. Ether is added thereto, the ethereal solution from which aqueous phase no longer separates is dried with solid calcium chloride, filtered and the bulk of the ether is distilled off at standard pressure. The residue is subjected to a vacuum distillation and gives the following fractions:

(1) boiling point 30° to 85° C. at 12 mm. Hg: 23.2 parts
(2) boiling point 85° to 90° C. at 10 mm. Hg: 343.5 parts
(3) boiling point 90° to 92° C. at 11 mm. Hg: 45.7 parts The infrared spectrum and analytical data show that fractions 2 and 3 consist of practically pure butene-(2)-carbolic acid-(1).

Analysis.—$C_4H_6O_2$ (molecular weight 86). Fraction 2, found: C, 60.0%; H, 8.1%; molecular weight, 106. Fraction 3, found: C, 60.0%; H, 7.9%; molecular weight, 106. Calculated: C, 60.0%; H, 8.0%; molecular weight, 100.

EXAMPLE 64

1 part of bis-triphenylphosphine palladium dichloride, 160 parts of cyclohexene and 80 parts of 18% aqueous hydrochloric acid are charged into an autoclave of corrosion-resistant steel. The autoclave is closed, flushed out with nitrogen and 300 atmospheres of carbon monoxide is forced in. The temperature is brought to 120° C. and carbon monoxide is forced in up to a pressure of 700 atmospheres. The said pressure and temperature are maintained for fourteen hours after which the autoclave is cooled and released from pressure. The product amounts to 274 parts and the total absorption of carbon monoxide is 170 atmospheres.

Ether is added to the product, the aqueous phase is separated, the ethereal layer is dried with calcium chloride and the ether then removed in vacuo. 217 parts of residue remains and is distilled over a short column in a high vacuum. 3.6 parts of first runnings boiling below 80° C. is obtained and 194 parts of cyclohexane carboxylic acid (boiling point 80° to 85° C. at 0.1 mm. Hg) having a melting point of 34° C.

EXAMPLE 65

50 parts of 6% by weight aqueous hydrochloric acid, 1 part of bis-triphenylphosphine palladium dichloride and 110 parts of cyclooctene are reacted with carbon monoxide at 120° C. as in Example 62. A total of 130 atmospheres of carbon monoxide is absorbed in the course of about four hours. 170.5 parts of crude product is obtained consisting of two layers. The organic layer is separated and distilled over a column. 2.3 parts of first runnings boiling at 110° C. at 0.7 mm. Hg, 95 parts of cyclooctane carboxylic acid having a boiling point of 113° C. at 0.7 mm. Hg and 0.8 part of a higher boiling point last runnings are obtained. 6 parts of a difficultly distillable residue remains in the still.

EXAMPLE 66

70 parts of water, 1 part of bis-triphenylphosphine palladium dichloride and 108 parts of cyclooctadiene-(1,5) are reacted as in Example 62, the initial pressure being 400 atmospheres of carbon monoxide and the temperature being 130° C. A total of 60 atmospheres of carbon monoxide is absorbed in four hours and 192 parts of crude product is obtained which consists of two layers. 130 parts of organic layer is separated and distilled over a column. The first runnings (boiling up to 103° C. at 0.45 mm. Hg) amounts to 8 parts and consists partly of water and partly of cyclooctene-(4)-carboxylic acid-(1). 74 parts of cyclooctene-(4)-carboxylic acid-(1) then passes over at 106° to 112° C. at 0.45 mm. Hg.

EXAMPLE 67

108 parts of cyclooctadiene-(1,5), 70 parts of 6% by weight aqueous hydrochloric acid and 1 part of bis-triphenylphosphine palladium dichloride are reacted as described in Example 66. A total of 30 atmospheres of carbon monoxide is absorbed in about three hours. 186 parts of a two-phase crude product is obtained. The organic phase is distilled. 25 parts of cyclooctadiene-(1,5) is recovered as first runnings. 79 parts of cyclooctene-(4)-carboxylic acid-(1) then passes over at 105° to 109° C. at 0.3 mm. Hg.

EXAMPLE 68

108 parts of cyclooctadiene-(1,5), 70 parts of 6% by weight aqueous hydrochloric acid and 1 part of bis-triphenylphosphine palladium dichloride are reacted at 100° C. as described in Example 62. As soon as reaction has been initiated (recognizable by a marked drop in pressure), a rise in temperature to about 130° C. is observed. The drop in pressure amounts to 140 atmospheres. The solid product (155 parts) is taken up in 700 parts of ether and the ethereal solution is filtered and boiled for one hour with active carbon. After having stood over active carbon overnight, it is filtered and dried with calcined sodium sulfate. The sodium sulfate is filtered off and 300 parts of petroleum ether is added to the filtrate; cyclooctane dicarboxylic acid-(1,5) thus separates, at first as an oily layer. This is freed from last traces of ether and petroleum ether in a water jet vacuum. The cyclooctane dicarboxylic acid-(1,5) gradually changes into the crystalline condition.

Analysis.—$C_{10}H_{16}O_4$. Calculated: C, 60.0%; H, 8.0%; O, 32.0%; molecular weight, 200; acid number, 560; iodine number 0. Found: C, 59.5%; H, 7.9%; O, 32.5%; molecular weight, 196; acid number, 546; iodine number 1.04.

Calculated from the acid number, the acid is of about 98% strength. The petroleum ether-ether solution may be evaporated and another 21 parts of white crystals of cyclooctane dicarboxylic acid-(1,5) thus obtained.

EXAMPLE 69

1 part of bis-triphenylphosphine palladium dichloride, 162 parts of cis-trans-trans-cyclododecatriene-(1,5,9) and 60 parts of water are charged into an autoclave. The autoclave is closed, flushed out with nitrogen and 300 atmospheres of carbon monoxide is forced in. The rotating autoclave is heated to 130° C. and carbon monoxide is forced in up to a pressure of 700 atmospheres. The pressure and temperature are maintained for ten hours and the autoclave is then allowed to cool and released from pressure. 217 parts of product is obtained. The total absorption of carbon monoxide is 40 atmospheres.

32.9 parts of a substance is obtained which gradually crystallizes and whose analytical data agree with those calculated for cyclododecadiene-(5,9)-monocarboxylic acid-(1).

Analysis.—Calculated: C, 74.8%; H, 9.6%; O, 15.4%; molecular weight, 208; acid number, 268; hydrogenation iodine number 243. Found: C, 74.3%; H, 9.6%; O, 16.4%; molecular weight, 193; acid number, 267; hydrogenation iodine number, 242.

EXAMPLE 70

110 parts of 18% aqueous hydrochloric acid and 0.8 part of bis-triphenylphosphine palladium dichloride are charged into an autoclave of corrosion-resistant steel. The autoclave is closed, rinsed out with nitrogen and then a gas mixture of 50% by volume of ethylene and 50% by volume of carbon monoxide is forced in until the pressure is 300 atmospheres. The autoclave is then set in rotation and heated to 120° C. As soon as this temperature has been reached, further gas mixture is forced in up to a total pressure of 700 atmospheres. The temperature rises temporarily to 165° C. The drop in pressure is equalized by forcing in further mixture of ethylene and carbon monoxide at hourly intervals and the temperature is kept at 120° C. Ten hours after the temperature first reached 120° C., the autoclave is cooled and decompressed. The liquid product amounts to 432 parts and the total absorption of carbon monoxide to 1250 atmospheres. The product is subjected direct to vacuum distillation over a short column and the following fractions are obtained: 19.1 parts of first runnings (mainly propionic acid), 332.2 parts of propionic acid and 11.2 parts of last runnings consisting of propionic acid with a fraction of higher boiling point. 26.0 parts are condensed in a cooled trap (cooled with solid carbon dioxide) and this is mainly composed of water, hydrogen chloride and ethyl chloride. 17 parts of an oily viscous residue remains in the still.

EXAMPLE 71

110 parts of 18% by weight hydrochloric acid and 0.8 part of bis-triphenylphosphine palladium dichloride are placed in an autoclave. The autoclave is flushed out with nitrogen and about 150 parts of vinyl chloride is forced in. Carbon monoxide is then forced in up to 300 atmospheres, the autoclave is heated to 120° C. and carbon monoxide is forced in up to a pressure of 700 atmospheres at this temperature for ten hours. The total absorption of carbon monoxide is 320 atmospheres. 237 parts of crude product is obtained which is worked up as in Example 64. Vacuum distillation gives 13.2 parts of a α-chloropropionic acid having a boiling point of 78° to 81° C. at 10 mm. Hg.

EXAMPLE 72

0.8 part of dibenzonitrile palladium dichloride and 110 parts of 18% aqueous hydrochloric acid are placed in an autoclave. The autoclave is closed and rinsed out with nitrogen. Then a mixture of ethylene and carbon monoxide containing 25% by volume of ethylene and 75% by volume of carbon monoxide is forced in cold up to a pressure of 300 atmospheres gauge and the reaction mixture is heated to 120° C. while rotating the autoclave. As soon as the temperature has reached 120° C., further amounts of the above gas mixture are forced in up to a pressure of 700 atmospheres which is maintained by forcing in further amounts. After ten hours the autoclave is cooled and decompressed. 358 parts of product is obtained; the total gas absorption is 440 atmospheres.

The product is distilled over a short column and 2.0 parts of first runnings, 319.4 parts of propionic acid having the refractive index $n_D^{20}=1.3870$ and an acid number of 742 are obtained. 15.0 parts of undistillable viscous oil remains in the still.

EXAMPLE 73

0.8 part of bis-triphenylphosphine palladium dichloride and 110 parts of 18% aqueous hydrochloric acid are charged into an autoclave of corrosion-resistant steel. The autoclave is closed and flushed out with nitrogen. Then a gas mixture consisting of 75% by volume of carbon monoxide and 25% by volume of ethylene is forced in up to a pressure of 300 atmospheres gauge. The pressure vessel is then set in rotation and heated to 120° C. As soon as this temperature has been reached, carbon monoxide is forced in up to 700 atmospheres and this pressure is maintained by forcing in further carbon monoxide. The autoclave is cooled after ten hours and released from pressure. The total absorption of carbon monoxide is 340 atmospheres and the amount of product is 227 parts. The product is fractionally distilled. 158 parts of aqueous 53% propionic acid is obtained at 55° to 57° C. at 90 mm. Hg. Then 42 parts of pure propionic acid passes over at 81° to 83° C. at 85 mm. Hg. (acid number 750; refractive index $n_D^{20}=1.3872$). Only 15 parts of residue remains in the still.

EXAMPLE 74

The procedure of Example 73 is followed but the catalyst used is 1 part of triphenylphosphinepiperidine palladium dichloride instead of bis-triphenylphosphine palladium chloride. The total absorption of carbon monoxide is 240 atmospheres and the product is 237 parts. Distillation gives a fraction boiling at 47° to 81° C. at 93 mm. Hg. which consists to the extent of 47% of aqueous propionic acid. Then 52 parts of pure propionic acid is obtained at 81° to 86° C. at 93 mm. Hg. (acid number 756, refractive index $n_D^{20}=1.3870$). 20 parts of residue remains in the still.

EXAMPLE 75

100 parts of ethanol, 1 part of tetrakistriphenylphosphine palladium(0) and 10 parts of 5 N aqueous sulfuric acid are placed in an autoclave of stainless steel which has been purged with nitrogen in an atmosphere of nitrogen. The autoclave is closed and liquid propylene pumped in to a pressure of 12 atmospheres gauge. Carbon monoxide is then pumped in at ordinary temperature to a pressure of 200 atmospheres. The autoclave is rotated and heated to 80° C. Carbon monoxide is then pumped in to a pressure of 700 atmospheres and this pressure maintained for 24 hours by pumping in fresh carbon monoxide. 290 atmospheres carbon monoxide is absorbed during this time and a yield of 136 parts is obtained. The alcohol is removed by washing the reaction mixture with an equal volume of saturated calcium chloride solution after which the organic phase which separates out is distilled. 55 parts of a fraction, boiling point 80 to 118° C. at 760 mm., is obtained. Gas chromatographic examination shows that the product contains 50% ethyl isobutyrate and 44% ethyl n-butyrate.

EXAMPLE 76

100 parts of methanol, 0.8 part of tetrakistriphenylphosphine palladium(0) and 4 parts of 5 N aqueous sulfuric acid are reacted with propylene and carbon monoxide at 80° C. as described in Example 75. The reaction mixture absorbs 510 atmospheres carbon monoxide within a period of 10 hours. A yield of 160.5 parts is obtained and worked up as described in the previous example. On distillation 80 parts, boiling point 82 to 104° C. at 760 mm., is obtained, consisting of 75% isomethyl butyrate and 43% methyl n-butyrate.

EXAMPLE 77

100 parts of methanol, 0.8 part of bis-triphenylphosphine palladium dichloride and 3 parts of 5 N aqueous sulfuric acid are reacted with propylene and carbon monoxide as in Example 75. 830 atmospheres carbon monoxide is absorbed and a crude yield of 230 parts obtained. After working up the product as described in Example 75 a main fraction of 159 parts is obtained. It boils at 84 to 104° C. at 760 mm. and consists of 63% methyl isobutyrate and 37% methyl n-butyrate.

EXAMPLE 78

100 parts of methanol, 0.5 part of bis-triphenylphosphine palladium sulfate and 3 parts of 5 N aqueous sulfuric acid are reacted with carbon monoxide and propylene as in Example 75. 270 atmospheres carbon monoxide is absorbed and a yield of 112 parts obtained. The product is worked up in a manner described and boils at 80 to 101° C. at 760 mm. 32.5 parts of methyl butyrate is obtained consisting of 48% of iso compound and 52% of n-compound.

EXAMPLE 79

100 parts of methanol, 2 parts of glacial acetic acid and 0.8 part of tetrakistriphenylphosphine palladium(0) are reacted with propylene and carbon monoxide as in Example 75. 100 atmospheres carbon monoxide is absorbed and the crude yield consists of 95 parts. The crude product is treated with concentrated calcium chloride solution yielding 18 parts of organic material. 15.5 parts of methyl butyrate, boiling point 89 to 104° C. at 760 mm. and consisting of 48% iso compound and 52% n-compound, is obtained.

EXAMPLE 80

100 parts of methanol, 0.8 part of bis-triphenylphosphine palladium dichloride and 1 part of phosphoric acid are reacted with propylene and carbon monoxide as in Example 75. 840 atmospheres carbon monoxide is absorbed and a crude yield of 246 parts obtained. The reaction product is extracted twice with aqueous calcium chloride solution and finally washed with soda solution. 176 parts of organic phase is obtained which is distilled, yielding 166.5 parts of methyl butyrate, boiling point 92 to 103° C. at 760 mm. The product consists of 66.6% iso form and 33.3 n-form.

EXAMPLE 81

100 parts of ethanol containing hydrogen chloride with acid value 123, 162 parts of cyclododecatriene-(1,5,9) and 1 part of triphenylphosphinepyridine palladium dichloride are placed in an autoclave of stainless steel that has been purged with nitrogen. The autoclave is closed and 200 atmospheres carbon monoxide pumped in at ordinary temperature. The autoclave is rotated and heated to 50° C. Carbon monoxide is then pumped in to a pressure of 300 atmospheres and this pressure maintained for four hours. 20 atmospheres carbon monoxide is absorbed during this period. A crude yield of 280 parts is obtained and the product is washed twice with aqueous calcium chloride solution, washed once with soda solution and then dried over solid calcium chloride. 184 parts of product is obtained which is then fractionated. 30 parts of unreacted cyclododecatriene-(1,5,9), boiling point 53 to 89° C. at 0.7 mm. is recovered. The main fraction boils at 97 to 145° C./0.7 mm. and consists of 120.5 parts. The main fraction consists of ethyl cyclododecadiene-(5,9)-1-carboxylate. 29 parts diethyl cyclododecene-(9) 1,5-dicarboxylate distils over at 149 to 158° C. (0.6 to 0.75 mm.).

EXAMPLE 82

100 parts of ethanol containing hydrogen chloride (acid value 123), 162 parts of cyclododecatriene-(1,5,9) and 1 part of benzylaminetriphenylphosphine palladium dichloride are reacted with carbon monoxide as in Example 81. 70 atmospheres carbon monoxide is absorbed within four hours and a crude yield of 268 parts obtained. The product is worked up as described in Example 81 yielding 207 parts of product which is distilled. 26 parts of cyclododecatriene-(1,5,9), boiling point 52 to 78° C. (0.7 mm.), is obtained followed by 133 parts of cyclodecatriene-(5,9)-carboxylic acid-1-ethylester, boiling point 98 to 130° C. (0.7 mm.). Approximately 26 parts of cyclododecene-(9)-dicarboxylic acid-(1,5)-diethyl ester, boiling point 136 to 153° C. (0.7 to 0.6 mm.) is also obtained.

EXAMPLE 83

180 parts of lauryl alcohol, 1 part of bis-triphenylphosphine palladium dichloride, 5 parts of 5 N aqueous hydrochloric acid and 100 parts of propylene are introduced into an autoclave of stainless steel that has been purged with nitrogen. The autoclave is closed, 300 atmospheres carbon monoxide pumped in at ordinary temperature, set in motion and heated to 100° C. 700 atmospheres carbon monoxide is then pumped in and this pressure maintained for several hours. 140 atmospheres carbon monoxide is absorbed and a yield of 377 parts obtained. 275 parts is obtained on distillation. 35 parts first runnings is obtained boiling up to 50° C. at 0.5 mm. 234 parts of lauryl butyrate, boiling pont 125 to 148° C. (0.3 mm.) is then obtained.

*Analysis.*—$C_{16}H_{32}O_2$. Calculated: C, 75.2%; H, 12.4%; O, 12.4%. Found: C, 75.1%; H, 12.9%; O, 12.2%.

EXAMPLE 84

90 parts of phenol, 1 part of bis-triphenylphosphine palladium dichloride, 3 parts of 5 N aqueous hydrochloric acid and 100 parts of propylene are reacted with carbon monoxide as in Example 83. The carbon monoxide pressure is reduced by 90 atmospheres. 170 parts of crude product is obtained which is distilled in vacuo. The first runnings distil over at 36 to 60° C. (0.1 mm.) and comprise 36 parts. Phenyl butyrate distils at 60 to 67° C. (0.1 mm.), 107 parts of this fraction being obtained.

EXAMPLE 85

108 parts of cyclooctadiene-(1,5), 85 parts of ethylene chlorohydrin, 1 part of bis-triphenylphosphine palladium dischloride and 5 parts of 5 N aqueous hydrochloric acid are reacted with carbon monoxide as in Example 83. 70 atmospheres carbon monoxide is absorbed and a crude yield of 229 parts is obtained. 214 parts of this is distilled. 64 parts of a substance, boiling point 100 to 105° C. (0.4 mm.), is obtained which according to the ultra-red spectrum consists of cyclooctene-(4)-carboxylic acid-(1)-β-chloroethyl ester. A further 20 parts distils over at 120 to 150° C. (0.4 mm.). This fraction as indicated by the ultra-red spectrum contains only 50% of the ester desired.

EXAMPLE 86

100 parts of alcohol containing hydrogen chloride (acid value 50), 108 parts of isobutylene and 1 part of bis-triphenylphosphine palladium dichloride are reacted with carbon monoxide as in Example 83. 110 atmospheres carbon monoxide is absorbed and a yield of 133 parts is obtained. The product is distilled under ordinary pressure. 103 parts of alcohol distils over at 76 to 78° C. together with a substance which can be obtained by washing the alcohol with water and on redistillation boils at 65 to 72° C. 20 parts of ethyl piralate, boiling point 115 to 123° C., is obtained; $n_D^{20}$ found, 1.3925 (given in the literature 1.3912).

EXAMPLE 87

120 parts of alcohol containing hydrogen chloride (acid value 100), 104 parts of styrene and 1 part of bis-triphenylphosphine palladium dichloride are reacted with carbon monoxide as described in Example 83 with the exception that a temperature of 90° C. is employed. 100 atmospheres carbon monoxide is absorbed and a yield of 242 parts is obtained. The product is distilled, yielding 64 parts, boiling point 73 to 74° C. (0.5 mm.). This fraction consists of ethylphenylmethyl acetate.

*Analysis.*—Calculated: C, 74.1%; H, 7.9%; O, 18.0%. Found: C, 74.1%; H, 8.1%; O, 18.0%.

EXAMPLE 88

1 part of bis-triphenylphosphine palladium diiodide, 120 parts cyclododecatriene-(1,5,9) and 36 parts ethanolic hydrochloric acid with acid value 56 are placed in an autoclave fitted with a glass liner, the autoclave is purged with nitrogen and 200 atmospheres carbon monoxide pumped in. The autoclave is then rotated and heated to 80° C. Carbon monoxide is then pumped in to a pressure of 300 atmospheres and the pressure and temperature are kept constant for four hours. 80 atmospheres carbon monoxide is consumed and a yield of 170 parts obtained. The product is distilled in high vacuum through a short column. 23.1 parts of unreacted cyclododecatriene is obtained together with 91.1 parts of cyclododecadiene-(5,9) monocarboxylic acid-(1)-ethyl ester and 13.9 parts of cyclododecene-(9)-dicarboxylic acid-(1,5)-diethyl ester.

EXAMPLE 89

0.3 part of bis-triphenylphosphine palladium dibromide, 162 parts of cyclododecatriene-(1,5,9) and 100 parts of methanolic hydrochloric acid with acid value 79 are introduced into an autoclave. The autoclave is purged with nitrogen, 200 atmospheres carbon monoxide is pumped in and the autoclave heated to 80° C. Carbon monoxide is then pumped in to a pressure of 700 atmospheres and the pressure and temperature are kept constant for four hours. 140 atmospheres carbon monoxide is absorbed and a yield of 270 parts obtained. The reaction product is washed with saturated calcium chloride solution and saturated soda solution and dried over solid calcium chloride. The product is distilled in vacuo through an efficient column and 45.9 parts of unreacted cyclododecatriene obtained together with 89.0 parts of cyclododecadiene-(5,9)-carboxylic acid-(1)-methyl ester and 21.4 parts of cyclododecene-(9)-dicarboxylic acid-(1,5)-dimethyl ester.

EXAMPLE 90

The reaction is carried out as in Example 89 except that 0.3 part of dimeric triphenylphosphinethiophenolato palladium monochloride is used in place of bis-triphenylphosphine palladium dibromide. 100 atmospheres gas is absorbed and a yield of 262 parts obtained. The product is distilled yielding 90.4 parts of unreacted cyclododecatriene, 55.0 parts of cyclododecadiene-(5,9)-carboxylic acid-(1)-methyl ester and 2.6 parts of cyclododecene-(9)-dicarboxylic acid-(1,5) dimethyl ester.

EXAMPLE 91

The reaction is carried out as in Example 88 except that 1 part of mono-tri-n-butylphosphine palladium dichloride is employed as catalyst. 20 atmospheres carbon monoxide is absorbed and a yield of 98.3 parts obtained in the glass liner while a further 57 parts which is rejected is present in the autoclave. On distillation 48.8 parts of unreacted cyclododecatriene-(1,5,9) and 32.7 parts of cyclododecadiene - (5,9)-monocarboxylic acid-(1)-ethyl ester are obtained.

EXAMPLE 92

The reaction is carried out as in Example 88 except that 3 parts of tris-triphenylphosphine palladium dinitrate, obtained by reacting an aqueous palladium nitrate solution with an excess of triphenyl phosphine in benzene solution, is employed at catalyst. 20 atmospheres carbon monoxide is absorbed and a yield of 164 parts obtained in the glass liner. On distillation 20.1 parts of cyclododecatriene-(1,5,9), 88.4 parts of cyclododecadiene-(5,9)-monocarboxylic acid-(1)-ethyl ester and 26.5 parts of cyclododecene-(9)-dicarboxylic acid-(1,5)-diethyl ester are obtained.

EXAMPLE 93

The reaction is carried out as in Example 88 with the exception that 3 parts of bis-tri-o-tolylphosphite palladium dichloride, obtained by mixing thoroughly an aqueous hydrochloric acid solution of palladium(II) chloride with an excess of a 30% solution of tri-o-tolylphosphite in cyclohexane, is employed as catalyst. 20 atmospheres carbon monoxide is absorbed and a yield of 149.7 parts obtained in the glass liner. On distillation 67.6 parts cyclododecatriene-(1,5,9) and 55.2 parts cyclododecadiene-(5,9)-monocarboxylic acid-(1)-ethyl ester are obtained.

EXAMPLE 94

1 part of bis-triphenylphosphine palladium dichloride, 93 parts of glycol and 3 parts of concentrated aqueous hydrochloric acid are introduced into an autoclave. The autoclave is purged with nitrogen and 80 parts propylene pumped in followed by carbon monoxide to give a total pressure of 300 atmospheres. The autoclave is heated to 100° C. and carbon monoxide pumped in to a pressure of 700 atmospheres. The autoclave is maintained under these conditions for 12 hours and then allowed to cool. A yield of 118 parts is obtained which is extracted with ether. The ether extract is washed with water, dried over calcium chloride and concentrated in vacuo. The residual liquid is distilled yielding 28.8 parts of a mixture of glycol butyrates and glycol isobutyrates boiling between 51 and 60° C. at 0.01 mm.

EXAMPLE 95

1 part of bis-triphenylphosphine palladium dichloride, 1 part of tert.- butyl catechol employed as polymerization inhibitor, 162 parts of 1-vinylcyclohexene-(3) and 100 parts of methanolic hydrochloric acid with acid value 77 are introduced into an autoclave which has been purged with nitrogen. Carbon monoxide is then pumped in to a pressure of 200 atmospheres and the autoclave set in motion and heated to give an internal temperature of 70° C. Carbon monoxide is then pumped in to a pressure of 300 atmospheres. 70 atmospheres is absorbed over a period of four hours, this gas absorption being replenished by pumping in gas. The autoclave is allowed to cool and decompressed. A yield of 275 parts is obtained which is washed with calcium chloride solution and soda solution and dried over solid calcium chloride. The product is distilled in vacuo yielding 96 parts of a fraction boiling at 51 to 60° C. at 0.02 mm. and with a refractive index $n_D^{20}$: 1.4640. This fraction gives the following results.

*Analysis.*—C, 72.1%; H, 9.8%; O, 18.2%; molecular weight, 157; hydrogenation iodine value, 148; saponification value, 329.

The monocarboxylic acid methyl ester $C_8H_{13}COOCH_3$ assumed to be formed in the reaction has a composition of 71.5% C, 9.5% H and 19.1% O. Molecular weight: 168; hydrogenation iodine value 150; saponification value 333.

The infra-red absorption spectrum of the fraction shows only weak vinyl bands. The fraction is therefore a mixture of isomers in which cyclohexenyl propionic acid methyl ester predominates. The NMR spectrum of the bromination product shows that α-cyclohexenyl propionate acid methyl ester is mainly formed.

EXAMPLE 96

0.06 part of triphenylphosphine palladium(II) dichloride, 120 parts of cyclododecatriene-(1,5,9) and 36 parts of ethanolic hydrochloric acid with acid value 25 are introduced into an autoclave fitted with a glass liner. The autoclave is purged with nitrogen, rotated and heated to an internal temperature of 90° C. Carbon monoxide is then pumped in to a pressure of 300 atmospheres. After one hour the autoclave is allowed to cool and decompressed. A yield of 155 parts is obtained in the glass liner from which 75 parts of unreacted cyclododecatriene and 57.5 parts of cyclododecadiene-(5,9) monocarboxylic acid-(1)-ethyl ester are obtained on distillation.

EXAMPLE 97

1 part of bis-triphenylphosphine palladium(II) dichloride, 213 parts of 1-phenyldecatriene-(1,4,8), 100 parts of methanol and 5 parts of 12% aqueous hydrochloric acid are introduced into an autoclave which is then purged with nitrogen. Carbon monoxide is pumped in to a pressure of 200 atmospheres and the autoclave heated to an internal temperature of 90° C. Carbon monoxide is then pumped in to a pressure of 300 atmospheres. The pressure and temperature are maintained constant for four hours and the autoclave is rotated. A yield of 337 parts is obtained yielding on distillation 52.5 parts of 1-phenyldecadiene monocarboxylic acid methyl ester, boiling point 225° C. (5 mm.).

EXAMPLE 98

1 part of bis-triphenylphosphine palladium dichloride, 150 parts of methylvinyl acetate and 72 parts of methanolic hydrochloric acid with acid value 50 are introduced into an autoclave which is then purged with nitrogen. 300 atmospheres carbon monoxide is then pumped in and the autoclave heated to an internal temperature of 120° C. with rotation. Carbon monoxide is then pumped in to a pressure of 700 atmospheres. The reaction conditions are maintained constant for four hours, 30 atmospheres gas being absorbed during this period. Carbon monoxide is pumped in to compensate for the gas absorbed. A yield of 265 parts is obtained and the product is washed with calcium chloride solution and soda solution and dried over solid calcium chloride. On vacuum distillation 161.1 parts of methyl succinic acid dimethyl ester, boiling point 197° C. at normal pressure and 59 to 64° C. at 0.5 mm. is obtained; refractive index $n_D^{20}$: 1.4208.

*Analysis.*—Calculated: C, 52.6%; H, 7.5%; O, 40.0%; molecular weight, 160. Found: C, 52.7%; H, 7.3%; O, 40.1%; molecular weight, 160.

EXAMPLE 99

Bis-piperazine palladium dichloride is prepared from bis-benzonitrile palladium dichloride and piperazine in methylene chloride as solvent.

1 part of bis-piperazine palladium dichloride, 162 parts of cyclododecatriene-(1,5,9) and 50 parts of ethanolic hydrochloric acid with acid value 46 are introduced into an autoclave which is then purged with nitrogen. Carbon monoxide is pumped in to a pressure of 200 atmospheres and the autoclave heated to an internal temperature of 60° C. with rotation. Carbon monoxide is then pumped in to a pressure of 700 atmospheres and the autoclave is allowed to cool after four hours. A yield of 202 parts is obtained, from which 14 parts of cyclododecadiene-(5,9) monocarboxylic acid-(1)-ethyl ester is recovered.

EXAMPLE 100

The reaction is carried out as in Example 88 with the exception that 1 part bis-n-butylamine palladium dichloride is employed as catalyst. 24.1 parts of cyclododecadiene-(5,9)-carboxylic acid-(1)-ethyl ester is obtained.

EXAMPLE 101

The reaction is carried out as in Example 88 except that 3.4 parts of bis-acrylonitrile palladium dichloride is employed as catalyst. 34 parts of cyclododecadiene-(5,9)-carboxylic acid-(1)-ethyl ester is obtained.

EXAMPLE 102

108 parts of vinylcyclohexene-(3), 80 parts of aqueous 18% hydrochloric acid and 1 part of bis-triphenylphosphine palladium dichloride are introduced into an autoclave which is then purged with nitrogen. Carbon monoxide is then pumped in to a pressure of 300 atmospheres and the autoclave heated at 120° C. with rotation. Carbon monoxide is then pumped in to a pressure of 700 atmospheres, the temperature rising to 150° C. The autoclave is allowed to cool after four hours and decompressed. A sticky viscous reaction product is obtained which yields 45.6 parts of a mixture of isomers of dicarboxylic acids with the composition $C_8H_{14}(COOH)_2$.

*Analysis.*—Calculated: C, 60.0%; H, 8.0%; hydrogenation iodine value, 0. Found: C, 59.1%; H, 8.4%; hydrogenation iodine value, <20.

EXAMPLE 103

1 part of bis-triphenylphosphine palladium dichloride, 76 parts of glycol monomethyl ether and 3 parts of concentrated aqueous hydrochloric acid are introduced into an autoclave which is then purged with nitrogen. A mixture of equal parts of ethylene and carbon monoxide is then pumped in to a pressure of 300 atmospheres and the autoclave heated to 80° C. with rotation. The gas mixture is then pumped in up to a pressure of 700 atmospheres and the reaction conditions kept constant for six hours. A temporary increase in the temperature to 150° C. takes place together with an absorption of gas of 230 atmospheres. A yield of 118 parts is obtained which is distilled in vacuo through an efficient column. 24.3 parts of a fraction boiling at 58 to 75° C. (25 mm.) is washed with water at 0° C. and dried over solid potassium carbonate. 9 parts of glycol monomethyl ether propionate, boiling point 158 to 159° C., is obtained; saponification value found 432, calculated 424.

EXAMPLE 104

1 part of bis-triphenylphosphine palladium dichloride, 93 parts of glycol and 3 parts of concentrated aqueous hydrochloric acid are introduced into an autoclave which is purged with nitrogen. A mixture of equal parts of ethylene and carbon monoxide is pumped in to a pressure of 300 atmospheres and the autoclave heated to 120° C. with rotation. Carbon monoxide is pumped in to a pressure of 700 atmospheres at this temperature over a period of 10 hours. 50 atmospheres of gas is absorbed and a yield of 112 parts is obtained from which the solid constituent is separated by filtration. The filtrate is extracted with ether and the ether extract washed with water and dried over solid calcium chloride. The ether is distilled off yielding glycol dipropionate, boiling point 210° C.

EXAMPLE 105

80 parts of ethanol containing hydrogen chloride (acid value 50) and 2 parts diamine palladium dichloride are introduced into the glass liner of a stainless steel autoclave which is purged with nitrogen. The autoclave is closed and a mixture of equal parts of carbon monoxide and ethylene pumped in to a pressure of 300 atmospheres. The autoclave is rotated, heated to 100° C. and the mixture of carbon monoxide and ethylene pumped in to a pressure of 700 atmospheres. This pressure is maintained for 8 hours. 140 atmospheres of the carbon monoxide/ethylene mixture is absorbed. A yield of 74 parts is obtained in the glass liner and is extracted three times with water to remove the alcohol. 43 parts of organic phase is obtained and is distilled. 16.5 parts of first runnings is obtained followed by 23 parts of ethyl propionate, boiling point 97 to 99° C.; $n_D^{20}$: 1.3839 (literature 1.3838).

EXAMPLE 106

The reaction is carried out as in Example 88 except that 0.8 part of allyl palladium monochloride is employed as catalyst. A yield of 152.3 parts is obtained in the glass liner from which 20 parts cyclododecadiene-(5,9)-monocarboxylic acid-(1)-ethyl ester is obtained on distillation.

EXAMPLE 107

1.5 parts of diammine palladium dichloride, 80 parts of cyclododecatriene-(1,5,9) and 45 parts of ethanolic hydrochloric acid with acid value 50 are introduced into an autoclave fitted with a glass liner. The reaction is carried out as described in Example 88 and a yield of 95 parts is obtained in the glass liner. 17.4 parts of cyclododecadiene-(5,9)-monocarboxylic acid-(1)-ethyl ester is obtained from the product.

EXAMPLE 108

100 parts of ethanol containing hydrogen chloride (acid value 175), 1 part of bis-triphenylphosphine palladium dichloride and 100 parts of methyl butenine are introduced into a stainless steel autoclave which has been purged with nitrogen. Carbon monoxide is pumped in to a pressure of 200 atmospheres and the autoclave rotated and heated to 80° C. Carbon monoxide is then pumped in to a pressure of 700 atmospheres and this pressure maintained for five hours. 200 atmospheres carbon monoxide is absorbed and a yield of 259 parts is obtained. The product is washed twice with calcium chloride solution and once with sodium bicarbonate solution and dried over solid calcium chloride. 249 parts of product is obtained which is distilled yielding 86 parts of a fraction which boils at 93 to 95° C. (0.25 mm.). This product consists of 1,2-dimethylpropene-(1)-dicarboxylic acid-(1,3)-diethyl ester; $n_D^{20}$: 1.4564.

EXAMPLE 109

100 parts of alcohol, 160 parts of cyclododecatriene-(1,5,9), 5 parts of glacial acetic acid and 0.8 part of bis-triphenylphosphine palladium dichloride are reacted with carbon monoxide as described at 85° C., carbon monoxide being pumped in at ordinary temperature to a pressure of 300 atmospheres. Additional carbon monoxide is then pumped in at 85° C. to a pressure of 700 atmospheres. 90 atmospheres carbon monoxide is absorbed and a yield of 264 parts obtained which is distilled. 82 parts of alcohol is distilled off at ordinary pressure followed by 141 parts of cyclododecatriene-(1,5,9) and 16 parts of cyclododecadiene-(5,9)-carboxylic acid-(1)-ethyl ester which distils over at 102 to 117° C. (0.3 mm.).

We claim:

1. In a process for the carbonylation of olefinically unsaturated compounds to form products selected from the group consisting of carboxylic acids and carboxylic esters by reacting an olefinically unsaturated compound with carbon monoxide and with a hydroxy compound selected from the group consisting of water, alcohols and phenols in the presence of a catalyst, the improvement of employing as the essential catalyst about 0.01 to 1% by weight, with reference to the olefinically unsautrated compound, of a complex palladium salt having the formula $L_mPdX_n$ in which L denotes a member selected from the group consisting of organic phosphines, organic phosphites, ammonia, amines, nitriles and unsaturated hydrocarbons, X denotes an acid equivalent selected from the group consisting of chloride, bromide, sulfate, phosphate, acetate, nitrate, propionate and borate, $m$ denotes an integer of from 1 to 4 inclusive and $n$ denotes one of the numbers 1 and 2, the sum of $m+n$ being an integer of from 2 to 6, inclusive.

2. A process as claimed in claim 1 wherein the pressure is from 25 to 1000 atmospheres.

3. A process as claimed in claim 1 wherein the temperature is from 20° to 250° C.

4. A process as claimed in claim 1 wherein the hydroxy compound is water and the temperature is from 70° to 170° C.

5. A process as claimed in claim 1 wherein the hydroxy compound is an alcohol and the temperature is from 30° to 100° C.

6. A process as claimed in claim 1 wherein the reaction is carried out in the presence of an acid.

References Cited

UNITED STATES PATENTS

| | | | |
|---|---|---|---|
| 3,065,242 | 11/1962 | Alderson et al. | 260—343.6 |
| 3,119,861 | 11/1962 | Blackham | 260—544 |
| 3,168,553 | 2/1965 | Slaugh | 260—514 |
| 3,309,403 | 3/1967 | Mador et al. | 260—544 |

OTHER REFERENCES

Tsuji: Tetrakedron Letters, No. 22, pp. 1437–1440, September 1963.

LORRAINE A. WEINBERGER, *Primary Examiner.*

P. K. KILLOS, *Assistant Examiner.*

U.S. Cl. X.R.

260—410.9, 413, 465.4, 476, 479, 482, 483, 484, 485, 486, 487, 497, 514, 515, 532, 533, 534, 537, 539

UNITED STATES PATENT OFFICE
CERTIFICATE OF CORRECTION

Patent No. 3,437,676                                                            April 8, 1969

Nikolaus von Kutepow et al.

It is certified that error appears in the above identified patent and that said Letters Patent are hereby corrected as shown below:

Column 3, line 48, "ethanol propanol" should read -- ethanol, propanol --. Column 5, line 25, "varaible" should read -- variable --. Column 6, line 61, "$C_3$" should read -- $C_4$ --. Column 8, line 36, "11.9" should read -- 11.19 --. Column 9, line 71, "20 Refractive index" should read -- Refractive index --. Column 10, second table, third column, line 2 thereof, "59" should read -- 50 --; same table, third column, line 3 thereof, "59-55" should read -- 50-55 --; same column 10, line 44, "dichlorde" should read -- dichloride --; same column 10, third table, sixth column, line 3 thereof, "37.9" should read -- 37.0 --; same column 10, line 59, "dchlorde" should read -- dichloride --. Column 11, first table, eighth column, line 4 thereof, "3 7" should read -- 3.7 --; same column 11, line 50, "42,3%" should read -- 42.3% --. Column 18, line 38, "75%" should read -- 57% --. Column 20, line 7, "dischloride" should read -- dichloride --. Column 26, after line 10, insert the following reference:

2,658,075    11/1953    Reppe et al. ------ 260-533

Signed and sealed this 5th day of May 1970.

(SEAL)
Attest:

EDWARD M. FLETCHER, JR.                          WILLIAM E. SCHUYLER, JR.
Attesting Officer                                                Commissioner of Patents